United States Patent

Lebourgeois et al.

[11] Patent Number: 6,071,430
[45] Date of Patent: Jun. 6, 2000

[54] LOW-LOSS FERRITE WORKING BETWEEN 1 MHZ AND 100 MHZ AND METHOD OF MANUFACTURE

[75] Inventors: Richard Lebourgeois, Villebon sur Yvette; Adéle Le Fur, Gif sur Yvette; Claude Rohart, Palaiseau, all of France

[73] Assignee: Thomson-CSF, Paris, France

[21] Appl. No.: 08/825,341

[22] Filed: Mar. 28, 1997

[30] Foreign Application Priority Data

Apr. 5, 1996 [FR] France ................................. 96 04316

[51] Int. Cl.⁷ .......................... C04B 35/30; C04B 35/34; H04B 5/00; H01F 19/00; H01F 17/04
[52] U.S. Cl. ................... 252/62.6; 252/62.62; 336/233; 336/221
[58] Field of Search ................ 252/62.6, 62.62; 336/233, 221

[56] References Cited

U.S. PATENT DOCUMENTS

| | | | |
|---|---|---|---|
| 3,032,503 | 5/1962 | Sixus et al. | 252/62.6 |
| 4,970,432 | 11/1990 | Tikes et al. | 315/3.5 |
| 4,985,659 | 1/1991 | Tikes et al. | 315/3.5 |
| 5,004,952 | 4/1991 | Tikes et al. | 315/3.5 |

FOREIGN PATENT DOCUMENTS 0 532 788 A1  3/1993  European Pat. Off. .
7-37711  2/1995  Japan .

OTHER PUBLICATIONS

Patent Abstracts of Japan, vol. 96, No. 9, & JP–A–08 133826 (Kyocera Corp.), May 28, 1996—Abridged.

Patent Abstracts of Japan, vol. 13, No. 343, (E–796), Aug. 2, 1989 & JP–A–01 101610 (Nippon Ferrite Ltd.), Apr. 19, 1989—Abridged.

H. T. Hahn, "The Substitution of Cobalt for Nickel in Stoichiometric Nickel–Zinc Ferrite", Journal of Applied Physics, vol. 69, No. 8, Apr. 15, 1991, pp. 6192–6194.

J. H. Nam, et al., "The Effects of Cu Substitution On The Electrical And Magnetic Properties Of NiZn Ferrites", 1995 Digests of Intermag. International Magnetics Conference, San Antionio, Apr. 18–21, 1995, p. JP–09.

*Primary Examiner*—C. Melissa Koslow
*Attorney, Agent, or Firm*—Oblon, Spivak, McClelland, Maier & Neustadt, P.C.

[57] ABSTRACT

Disclosed is a ferrite material having low magnetic losses at frequencies of about 1 megahertz to 100 megahertz, and having firing and sintering temperatures lower than about 1000° C. The material is a nickel-zinc-copper material with cobalt substitution, particularly well suited to the making of magnetic cores and more specifically to the making of micro-inductors.

5 Claims, 2 Drawing Sheets

LOW-LOSS FERRITE WORKING BETWEEN 1 MHZ AND 100 MHZ AND METHOD OF MANUFACTURE

BACKGROUND OF THE INVENTION

1. Field of the Invention

The field of the invention is that of ferrite materials used at high and very high frequencies (1 megahertz to 100 megahertz) and especially materials with low magnetic losses and low manufacturing temperatures.

Materials of this kind are in very great demand for the making of small-sized inductors used in filtering devices that work between 1 megahertz and 100 megahertz and more generally for the low-temperature manufacture of magnetic cores having low losses.

2. Description of the Prior Art

At present, the development of electronic equipment, in civilian as well as military applications, is linked to the miniaturization of the active and passive components used. Among these components, the most bulky ones are the passive components which fulfil the functions of resistors, capacitors and more particularly inductors.

In applications using so-called "low level" inductors implementing low electrical power values, the losses of the component are represented by a Q factor where $Q=L\omega/R$, with L as the series inductance, $\omega$ as the pulsation and R as the series resistance. The greater the coefficient Q, the higher the quality of the corresponding electrical circuit.

Ferrites with high Q factor values (of over 100) in high-frequency applications (of over one megahertz) are generally composite nickel-zinc ferrites. They are used as magnetic cores of a variety of shapes (toroid, pot-shaped, rod-shaped, etc.) enabling the making of wound inductors, the winding portion being made by means of enamelled copper wire. However, these materials have high manufacturing temperatures. Their firing temperature (firing being the heat treatment designed to form the required crystalline phase) is in the region of 1000° C. to 1100° C. Their sintering temperature (sintering being the heat treatment aimed at the complete formation of the crystal phase and the densification of this crystal phase) is in the region of 1200° C. to 1350° C.

Materials of this kind therefore cannot be used to make small-sized inductors, also called micro-inductors, into which the magnetic core and winding parts are integrated by co-sintering the ferrite of the magnetic core with the metal of the winding (which is conventionally silver).

Indeed, at present, micro-inductors that work in particular between 1 megahertz and 100 megahertz are made out of ferrites with relatively low sintering temperatures (below 1000° C.) which are indispensable to the prevention of the chemical reaction of the metal and especially silver. This reaction would have the consequence of causing the deterioration of the electrical properties of the metal and of the electromagnetic properties of the ferrite. The materials used for these applications form part of the family of nickel-zinc-copper ferrites which have electromagnetic properties close to those of nickel-zinc ferrites. The addition of copper in oxide form enables the sintering of these materials at temperatures of 900° C. to 1000° C. However, it lowers the Q factor values which drop 20 to 60 for the micro-inductors.

SUMMARY OF THE INVENTION

In this context, the present invention proposes a family of ferrites having firing and sintering temperatures that are lower than about 1000° C. and enable the making of inductors with Q factor values greater than about 100.

An object of the invention therefore is a ferrite material with low magnetic losses in a range of frequencies of about 1 megahertz to 100 megahertz wherein said material corresponds to the following chemical formula:

with $x + y + z + \varepsilon = 1 \pm \delta$ $\delta \leq 0.05$ $0.02 \leq \varepsilon \leq 0.04$ $0.1 \leq z \leq 0.35$ $0.05 \leq y \leq 0.40$ These materials have a twofold advantage:
- they can be used for the industrial-scale production of high frequency and very high frequency magnetic cores in order to significantly reduce the firing and sintering temperatures;
- they can be used for the industrial-scale production of micro-inductors in order to improve the Q factor values of conventional micro-inductors.

An object of the invention is also an inductive component working in a range of frequencies of about 1 to 100 megahertz comprising a ferrite material according to the invention.

Yet another object of the invention is a method for the manufacture of a ferrite material meeting the following chemical formula:

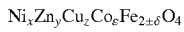

with $x + y + z + \varepsilon = 1 \pm \delta$ $\delta \leq 0.05$ $0.02 \leq \varepsilon \leq 0.04$ $0.1 \leq z \leq 0.35$ $0.05 \leq y \leq 0.40$ comprising a step for the sintering of powder obtained by the crushing of raw materials wherein the sintering step is performed at a temperature of less than 1000° C.

Advantageously, the method for the manufacture of a ferrite material according to the invention also comprises a firing step performed at a temperature of about 750 to 850° C.

BRIEF DESCRIPTION OF THE DRAWINGS

The invention will be understood more clearly and other features shall appear from the following description given by way of a non-restrictive example with reference to the appended figures, of which.

In general, the ferrite materials according to the invention may be made by using the conventional industrial-scale technology that comprises the following main operations:

Weighing of the following raw materials

Nickel oxide (NiO), zinc oxide (ZnO), iron oxide ($Fe_2O_3$), copper oxide (CuO) and cobalt oxide ($CO_3O_4$).

During the weighing of iron oxide, it is necessary to compensate for the addition of iron due to the wearing out of the crushing elements which are generally steel beads or bars.

Crushing of raw materials

This operation has the twofold aim of mixing the different constituent elements and reducing their grain size, thus making them more reactive.

Firing of the powder

This heat treatment is aimed at partly forming the desired crystalline phase. This operation may typically be performed between 750° C. and 850° C. depending on the desired nature of the ferrite material of the invention. It is performed under air for about 2 hours.

Recrushing of the product of firing

This operation is made necessary by the enlargement of the grains of powder that is caused by the firing process. It is done under conditions similar to that of the first crushing operation.

Pressing of the powder

This is done by means of steel molds and axial mechanical presses capable of delivering pressures in the range of 1 $t/cm^2$.

Sintering

This thermal treatment is aimed at the complete formation of the desired crystal phase as well as the densification of the polycrystalline ceramic. For the ferrite materials that are the object of the present invention, this processing may be done at temperatures of about 900° C. to 1000° C. with a plateau ranging from 2 hours to 15 hours.

EXAMPLE 1

Ferrite material with low magnetic losses in a frequency range of 1 megahertz to 30 megahertz.

A nickel-zinc-copper ferrite material with cobalt substitution, having a chemical composition $Ni_{0.35}Zn_{0.35}Cu_{0.28}Co_{0.02}Fe_2O_4$ is made by using the industrial method described here above, with a sintering operation being carried out in air at 930° C. for 2 hours.

This material has a magnetic moment at saturation $\sigma_{sat}$ equal to 73 uem/g and hence magnetization at saturation equal to 4800 Gauss.

Figure 1:
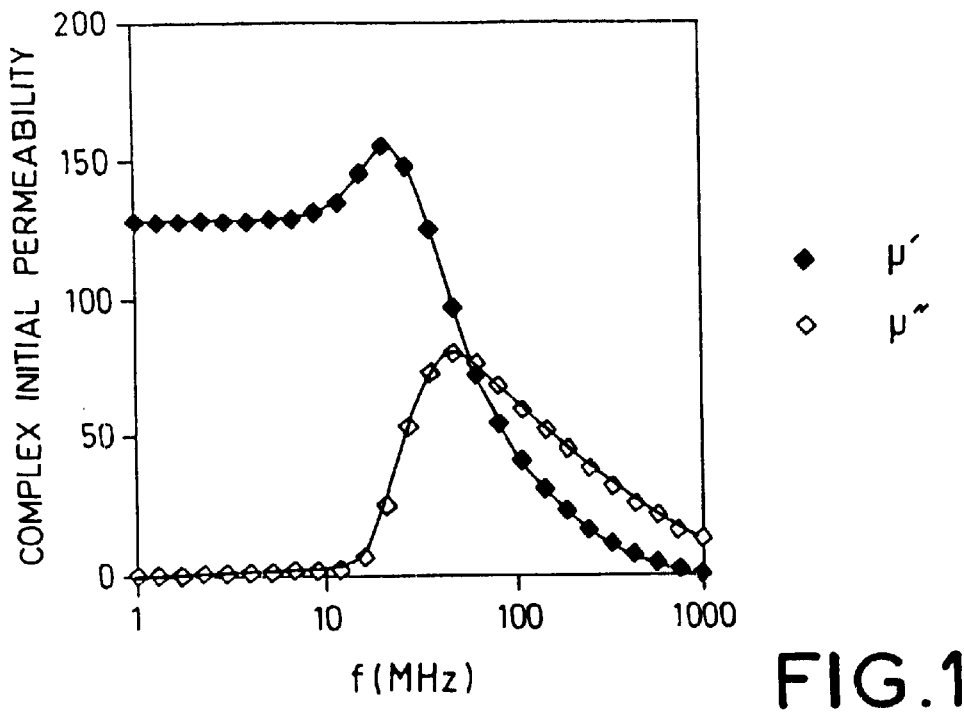
FIG. 1 illustrates the complex permeability of a first exemplary ferrite material according to the invention as a function of the frequency.

Its density $\rho$ is equal to 4.95 $g/cm^3$. Its complex initial permeability spectrum (corresponding to the ratio of the induction to the magnetic field for low-amplitude magnetic fields) as a function of the frequency is given in FIG. 1.

The magnetic losses represented by the imaginary part $\mu''$ are very small ($\mu''$ is smaller than 0.1 up to about 10 megahertz).

The real part of the permeability $\mu'$ remains always greater than a value of about 130 with a maximum of 155 at 20 megahertz.

This ferrite material is therefore particularly well suited to applications in a range of 1 to 30 megahertz. It can be used in this frequency range to make inductors by means of wound cores with high Q factor values and more particularly at frequencies of 2 to 3 megahertz with Q factor values greater than or equal to 150.

EXAMPLE 2

Ferrite material with low magnetic losses at very high frequency ranging from of 30 megahertz to 100 megahertz.

A nickel-zinc-copper ferrite material with cobalt substitution, having a chemical composition $Ni_{0.747}Zn_{0.083}Cu_{0.15}Co_{0.02}Fe_2O_4$ is made by using the industrial method described here above, with a sintering operation being carried out in air at 950° C. for 5 hours.

This material has a magnetic moment at saturation $\sigma_{sat}$ equal to 55 uem/g and hence magnetization at saturation equal to 3600 Gauss.

Figure 2:
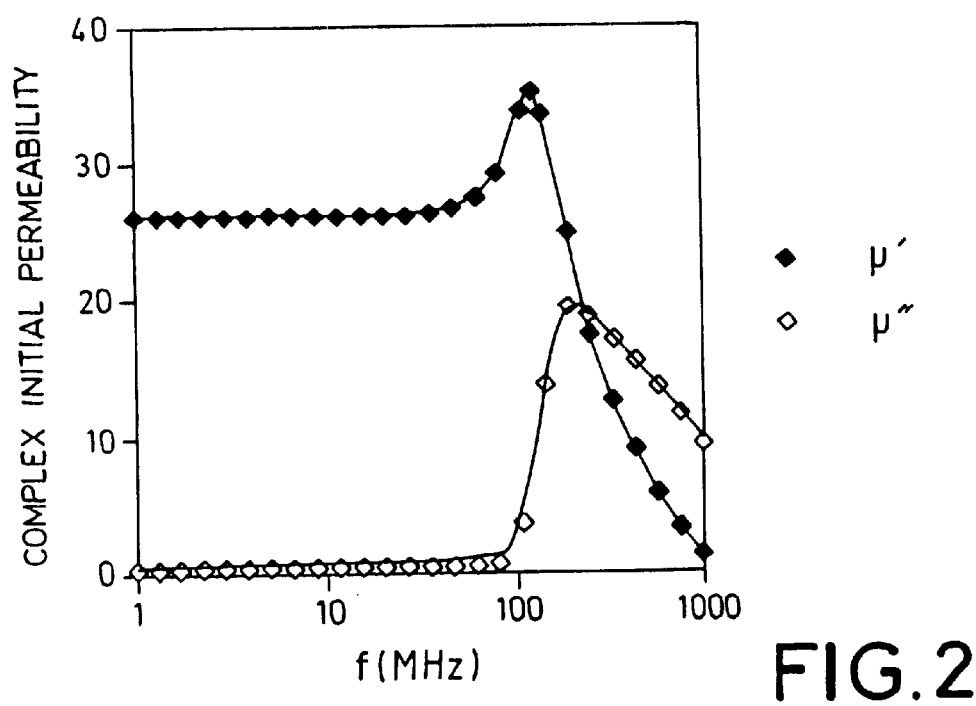
FIG. 2 illustrates the complex permeability of a second exemplary ferrite material according to the invention as a function of the frequency.

Its density $\rho$ is equal to 4.80 $g/cm^3$. Its permeability spectrum as a function of the frequency is given in FIG. 2.

The magnetic losses represented by the imaginary part $\mu''$ are very small ($\mu'' \leq 0.1$ up to about 100 megahertz) while the real part of the permeability $\mu'$ remains always greater than 26 with a maximum of 35 at 125 megahertz.

A ferrite material of this kind is particularly well suited to devices without losses working at very high frequency.

Comparison of two Ni—Zn—Cu ferrite materials of very similar composition with and without cobalt substitution These materials meet the following respective chemical formulae:

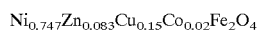

and

They were sintered under the same conditions (sintering temperature of 970° C. for 2 hours in air).

Figure 3:
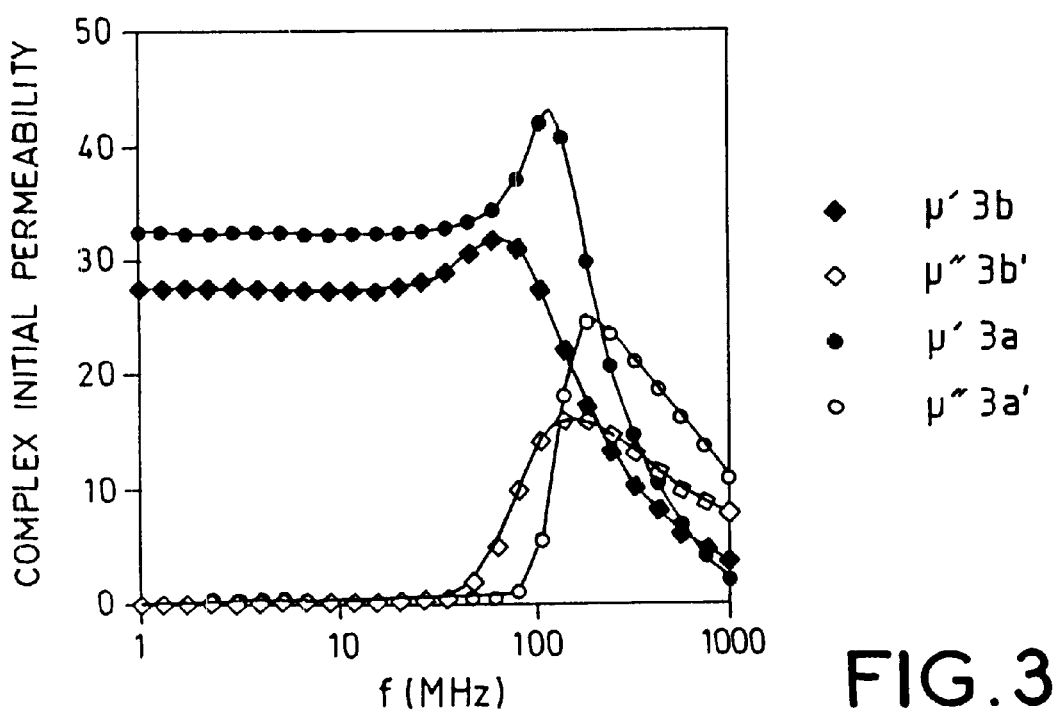
FIG. 3 illustrates the complex permeability as a function of frequency for two Ni—Zn—Cu ferrites respectively with and without cobalt substitution.

FIG. 3 illustrates the permeability as a function of the frequency for these two ferrite materials.

The curves 3a and 3b respectively represent the real values of permeability $\mu'$ of the substituted and non-substituted ferrites.

The curves 3a' and 3b' respectively represent the imaginary values of permeability $\mu''$ of the substituted and non-substituted ferrites.

It can clearly be seen that the ferrite with cobalt substitution prepared according to the method of the invention has the twofold advantage of having a greater permeability $\mu'$ and lower magnetic losses $\mu''$ between 1 megahertz and 100 megahertz.

What is claimed is:

1. A method for the manufacture of a ferrite material with low magnetic losses in a range of frequencies of about 1 megahertz to 100 megahertz, wherein said material corresponds to the following chemical formula:

with $x + y + z + \varepsilon = 1 \pm \delta$ $\delta \leq 0.05$ $0.02 \leq \varepsilon \leq 0.04$ $0.1 \leq z \leq 0.35$ $0.05 \leq y \leq 0.40$ comprising a step for the sintering of powder obtained by the crushing of raw materials wherein the sintering step is performed at a temperature of less than about 1000° C. to form said ferrite material, wherein said ferrite material has a Q factor value greater than about 100.

2. The method of manufacture according to claim 1, comprising a firing step performed at a temperature of about 750 to 850° C.

3. The method according to claim 1, for the manufacture of a ferrite material with low magnetic losses in a range of frequencies of about 1 megahertz to 30 megahertz wherein said material corresponds to the following chemical formula:

$$Ni_{0.35}Zn_{0.35}Cu_{0.28}Co_{0.02}Fe_2O_4.$$

4. The method according to claim 1, for the manufacture of a ferrite material with low magnetic losses in a range of frequencies of about 30 megahertz to 100 megahertz wherein said material corresponds to the following chemical formula:

$$Ni_{0.75}Zn_{0.08}Cu_{0.15}Co_{0.02}Fe_2O_4.$$

5. The method for the manufacture of a micro-inductor comprising a magnetic core made of ferrite material obtained by a method according to claim 1, comprising integrating a winding made of conductive material into the magnetic core.

* * * * *